(12) United States Patent
Beverly

(10) Patent No.: US 8,167,722 B2
(45) Date of Patent: May 1, 2012

(54) DISTRIBUTED PROCESSING SYSTEM AND METHOD

(75) Inventor: Harlan Titus Beverly, McDade, TX (US)

(73) Assignee: Qualcomm Atheros, Inc, San Jose, CA (US)

( * ) Notice: Subject to any disclaimer, the term of this patent is extended or adjusted under 35 U.S.C. 154(b) by 1682 days.

(21) Appl. No.: 11/429,834

(22) Filed: May 8, 2006

(65) Prior Publication Data

US 2006/0259579 A1    Nov. 16, 2006

Related U.S. Application Data

(60) Provisional application No. 60/679,904, filed on May 11, 2005, provisional application No. 60/596,257, filed on Sep. 12, 2005.

(51) Int. Cl.
*G06F 15/16* (2006.01)
(52) U.S. Cl. .......... 463/42; 463/40; 463/43; 463/29
(58) Field of Classification Search .......... 463/29, 463/40, 42, 43
See application file for complete search history.

(56) References Cited

U.S. PATENT DOCUMENTS

| | | |
|---|---|---|
| 5,353,412 A | 10/1994 | Douglas et al. |
| 5,355,371 A | 10/1994 | Auerbach et al. |
| 5,675,736 A | 10/1997 | Brady et al. |
| 5,771,287 A | 6/1998 | Gilley et al. |
| 5,890,963 A | 4/1999 | Yen |
| 6,009,458 A | 12/1999 | Hawkins et al. |
| 6,015,348 A | 1/2000 | Lambright et al. |
| 6,240,517 B1 | 5/2001 | Nishioka |
| 6,424,621 B1 | 7/2002 | Ramaswamy et al. |
| 6,615,218 B2 * | 9/2003 | Mandal et al. ............ 1/1 |
| 6,625,661 B1 | 9/2003 | Baldwin, Jr. et al. |
| 6,745,236 B1 | 6/2004 | Hawkins et al. |
| 6,763,371 B1 | 7/2004 | Jandel |
| 6,810,528 B1 | 10/2004 | Chatani |
| 6,908,389 B1 | 6/2005 | Puskala |
| 6,918,042 B1 | 7/2005 | Debry |
| 6,941,353 B1 | 9/2005 | Lane |
| 6,961,852 B2 | 11/2005 | Craft |

(Continued)

FOREIGN PATENT DOCUMENTS

DE    10218795    11/2003

(Continued)

OTHER PUBLICATIONS

International Search Report for PCT/US06/017659 dated Jul. 10, 2007, 3 pgs.

(Continued)

*Primary Examiner* — Dmitry Suhol
*Assistant Examiner* — Brandon Gray
(74) *Attorney, Agent, or Firm* — DeLizio Gilliam, PLLC

(57) ABSTRACT

A solution for managing communicative interactions between network elements is described herein. A system incorporating teachings of the present disclosure may include a processor module that monitors communications between a program resident on a user machine and a server program resident on a computing device remote from the user. The processor module may be utilized to effectively reduce the number of communications actually transmitted between the client program and the server program. For example, the processor module may intercept certain client initiated communications intended for the server program, process those communications without server program involvement, and respond to the client program.

33 Claims, 4 Drawing Sheets

U.S. PATENT DOCUMENTS

| | | |
|---|---|---|
| 6,970,943 B1 | 11/2005 | Subramanian et al. |
| 6,988,196 B2 | 1/2006 | Cromer et al. |
| 7,000,115 B2 | 2/2006 | Lewis et al. |
| 7,003,548 B1 | 2/2006 | Barck et al. |
| 7,046,680 B1 | 5/2006 | McDysan et al. |
| 7,056,217 B1* | 6/2006 | Pelkey et al. ............... 463/43 |
| 7,065,756 B2 | 6/2006 | Barsness et al. |
| 7,139,780 B2 | 11/2006 | Lee et al. |
| 7,209,449 B2 | 4/2007 | Tang et al. |
| 7,249,109 B1 | 7/2007 | Silverbrook et al. |
| 7,274,702 B2 | 9/2007 | Toutant et al. |
| 2002/0078223 A1 | 6/2002 | Baldonado et al. |
| 2002/0131404 A1* | 9/2002 | Mehta et al. ............... 370/352 |
| 2002/0180583 A1 | 12/2002 | Paatero et al. |
| 2002/0198932 A1 | 12/2002 | Wagner |
| 2003/0041136 A1 | 2/2003 | Cheline et al. |
| 2003/0177187 A1 | 9/2003 | Levine et al. |
| 2003/0191857 A1 | 10/2003 | Terrell et al. |
| 2003/0198017 A1* | 10/2003 | Hashimoto et al. ......... 361/687 |
| 2003/0204566 A1 | 10/2003 | Dhupelia et al. |
| 2004/0015725 A1 | 1/2004 | Boneh et al. |
| 2004/0068580 A1 | 4/2004 | Jo et al. |
| 2004/0230801 A1 | 11/2004 | Sueyoshi et al. |
| 2004/0246905 A1 | 12/2004 | Dunagan et al. |
| 2004/0249879 A1 | 12/2004 | Beverly |
| 2004/0259633 A1* | 12/2004 | Gentles et al. ............... 463/29 |
| 2005/0044270 A1 | 2/2005 | Grove et al. |
| 2005/0060442 A1 | 3/2005 | Beverly et al. |
| 2005/0107161 A1 | 5/2005 | Fujimoto et al. |
| 2005/0188073 A1 | 8/2005 | Nakamichi et al. |
| 2006/0010133 A1* | 1/2006 | Bozek et al. ............... 707/10 |
| 2006/0010265 A1 | 1/2006 | Aiken et al. |
| 2006/0069724 A1* | 3/2006 | Langdon ............... 709/203 |
| 2006/0121986 A1 | 6/2006 | Pelkey et al. |
| 2006/0160621 A1* | 7/2006 | Rowe et al. ............... 463/42 |
| 2006/0203842 A1* | 9/2006 | Wollmershauser et al. .. 370/463 |
| 2006/0259579 A1 | 11/2006 | Beverly |
| 2006/0259632 A1 | 11/2006 | Crawford et al. |
| 2006/0274750 A1 | 12/2006 | Babbar et al. |
| 2007/0005986 A1 | 1/2007 | Bernard et al. |
| 2007/0060373 A1 | 3/2007 | Beverly |
| 2007/0086343 A1 | 4/2007 | Kujawa et al. |
| 2007/0101408 A1 | 5/2007 | Nakhjiri |
| 2007/0189517 A1 | 8/2007 | Koseki et al. |
| 2007/0226498 A1 | 9/2007 | Walmsley et al. |
| 2007/0297405 A1 | 12/2007 | He |
| 2007/0298879 A1 | 12/2007 | Kobayashi et al. |
| 2008/0009337 A1 | 1/2008 | Jackson et al. |
| 2008/0009352 A1 | 1/2008 | Aoyama et al. |
| 2008/0010371 A1 | 1/2008 | Yamamoto et al. |
| 2008/0013551 A1 | 1/2008 | Scholl |
| 2008/0016236 A1 | 1/2008 | Beverly et al. |
| 2008/0022389 A1 | 1/2008 | Calcev et al. |
| 2008/0039208 A1 | 2/2008 | Abrink et al. |
| 2008/0045285 A1 | 2/2008 | Fujito |
| 2008/0049621 A1 | 2/2008 | McGuire et al. |

FOREIGN PATENT DOCUMENTS

| | | |
|---|---|---|
| JP | 10314451 | 12/1998 |
| JP | 2001246147 | 9/2001 |
| WO | 03062995 A2 | 7/2003 |

OTHER PUBLICATIONS

Bangun, Ricky A. et al., "A Network Architecture for Multiuser Networked Games on Demand," 1997 International Conference on Information, IEEE, vol. 3, pp. 1815-1819, XP002507873.

Smed, Jouni et al., "Aspects of Networking in Multiplayer Computer Games," Electronic Library Emerald UK, vol. 20, No. 2, 2002, pp. 87-97, XP002507872.

PCT International Search Report for PCT/US2008/057900, Jun. 25, 2008, 3 pages.

* cited by examiner

DISTRIBUTED PROCESSING SYSTEM AND METHOD

CROSS REFERENCE TO RELATED APPLICATIONS

This application claims priority to U.S. Provisional Patent Application No. 60/679,904, entitled "METHOD AND SYSTEM FOR DISTRIBUTED SECURE PROCESSING," filed on May 11, 2005, and U.S. Provisional Patent Application No. 60/596,257, entitled "METHOD AND SYSTEM FOR PASSIVE DATA UPDATE," filed on Sep. 12, 2005, which are assigned to the current assignee hereof and are incorporated herein by reference in their entirety.

FIELD OF THE INVENTION

The present disclosure relates generally to network communications, and more specifically to a distributed processing system and method for managing communicative interactions between network elements.

BACKGROUND

A network may be characterized by several factors like who can use the network, the type of traffic the network carries, the medium carrying the traffic, the typical nature of the network's connections, and the transmission technology the network uses. For example, one network may be public and carry circuit switched voice traffic while another may be private and carry packet switched data traffic. Whatever the make-up, most networks facilitate the communication of information between at least two nodes, and as such act as communication networks.

In recent years, several applications have been developed that rely on timely and effective interactions between two or more elements of a communication network. For example, in the sphere of online gaming, hundreds or thousands of game clients executing on user machines may be interacting with a central server executing on a networked computer. With such an architecture, the networked server computer is frequently tasked with providing content to clients, receiving client requests, processing those requests, responding to those requests, and synchronizing those requests with the requests of other clients. The perceived and/or real ability of the game server to engage in these communicative interactions with distributed clients may be adversely affected by several things such as network conditions, the amount of available bandwidth, the computing capabilities of the network server, and/or the computing capabilities of the user machines.

In the gaming context, if the communicative interactions are adversely affected or overly numerous, a game player may experience distracting events such as game freezes, stuttering, warping, etc. As such, a need exists for a distributed processing system and method that manages communicative interactions between network elements.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION

Figure 1:
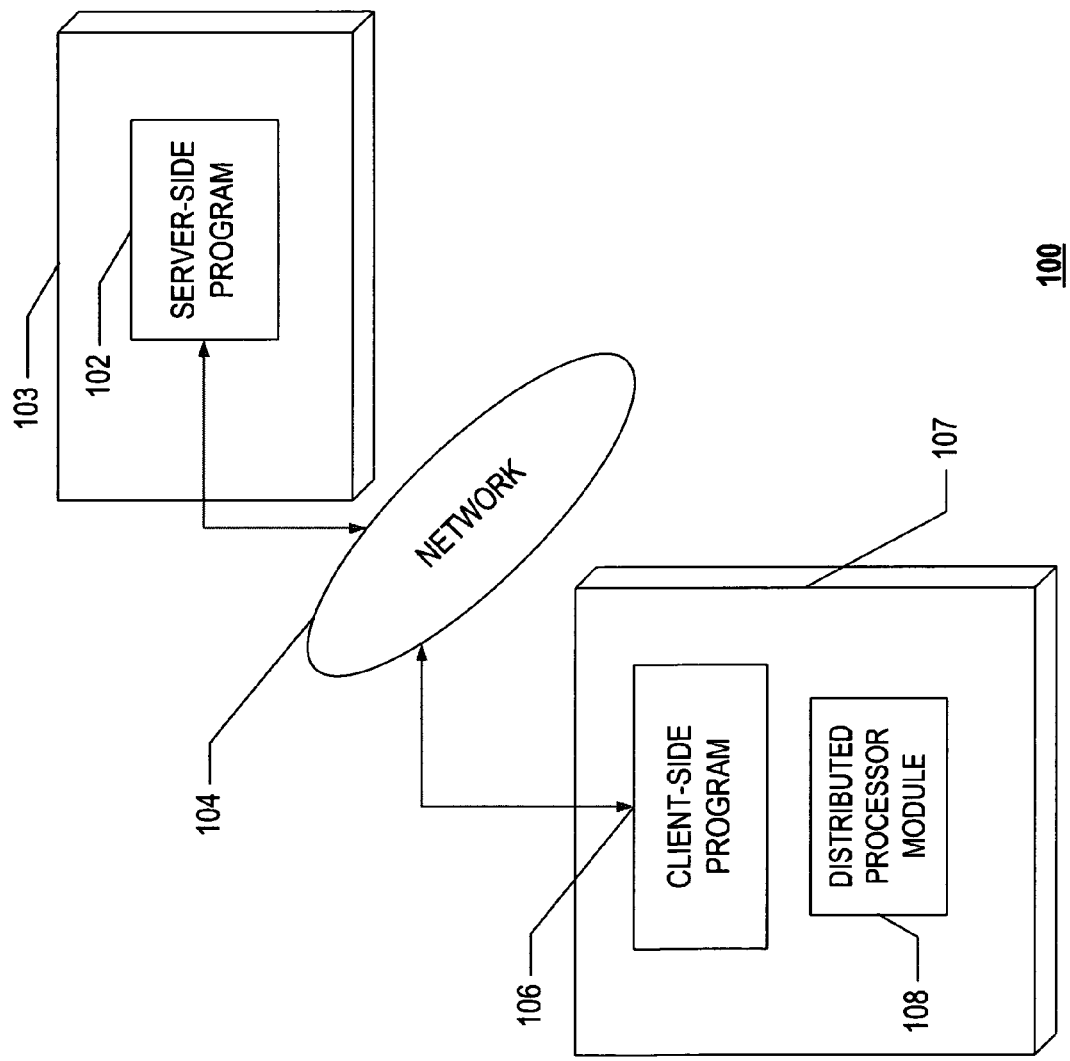
FIG. 1 is a block diagram of a particular embodiment of a network arrangement incorporating teachings of the present disclosure.

Embodiments discussed below describe, in part, distributed computing solutions that manage all or part of a communicative interaction between network elements. In this context, a communicative interaction may be one or more of: intending to send information, sending information, requesting information, receiving information, or receiving a request for information. As such, a communicative interaction could be one directional, bi-directional, or multi-directional. In some circumstances, a communicative interaction could be relatively complex and involve two or more network elements. For example, a communicative interaction may be "a conversation" or series of related communications between a client and a server—each network element sending and receiving information to and from the other. Whatever form the communicative interaction takes, it should be noted that the network elements involved need not take any specific form. A network element may be a node, a piece of hardware, software, firmware, middleware, some other component of a computing system, and/or some combination thereof.

Though much of the following discussion focuses on specific problems associated with online gaming, the teachings disclosed herein may have broader applicability. As such, discussions relating to gaming issues like lag, game freezes, stuttering, warping, etc. are not intended to limit the scope of the disclosure. In addition, though the specific embodiment described in connection with FIG. 1 involves a Massively Multiplayer Online Game (MMOG), other interactive applications such as Video On Demand, entertainment distribution, information distribution, etc., may also be implemented in a manner that incorporates the teachings disclosed herein.

From a high level, a system incorporating teachings of the present disclosure may include a processor module that monitors communications between a client program resident on a user machine and a server program resident on a computing device remote from the user. The server program may be part of a two-tier architecture that is deployed in a hub and spoke or centralized server configuration. The server program may also be utilized in a less centralized model. For example, the server program may be implemented as one of two or more client programs that perform server-like functionality.

However, the server program is implemented, the processor module may be utilized to effectively reduce the number of communications actually transmitted between the client program and the server program. For example, the processor module may intercept certain client initiated communications intended for the server program, process those communications without server program involvement, and respond to the client program. In some circumstances, the processor module may make it unnecessary to actually send the original client request to the server. Depending upon implementation detail, a different message—one indicating that the original client request has already been handled—may be sent from the processor module to the server. In practice, processing the communications without burdening the server program and without traversing a portion of the network may help reduce problems such as latency, lag, and loss of data coherency. Though the above discussion involves a client-to-server communication, the processor module may also be configured to affect server-to-client communications as well.

As indicated above, this application claims priority to U.S. Provisional Patent Application No. 60/679,904, filed on May 11, 2005, and U.S. Provisional Patent Application No. 60/596,257, filed on Sep. 12, 2005. The provisional applications describe in part specific implementations of the teachings disclosed herein and are not intended to limit the scope of the claims attached below. The entirety of both provisional applications is incorporated herein by reference As mentioned above, FIG. 1 depicts a block diagram of a network arrangement 100 that includes a server-side program 102 executing at a computing device 103, a network 104, and a client-side program 106 executing at a computing device 107. As depicted, computing device 107 also includes a processor module 108. The actual location of processor module 108 may be modified in other deployments. For example, a module may be implemented as a processor dongle, a "Lan on Motherboard" processor, etc. In the embodiment of FIG. 1, network 104 may be a wide area network, such as the Internet, a local area network, or some other appropriate network or bus. Within arrangement 100, computing devices 103 and 107 may be similar or different. For example, computing device 107 may be a local user computer, a laptop, a cellular telephone, a gaming console, a workstation, or some other appropriate device, and computing device 103 may be a server computer, a workstation, a peer of computing device 107, or some other appropriate device.

In operation, the client-side program 106 and the server-side program 102 may communicate with each other via the network 104. In one embodiment, client-side program 106 (occasionally referred to as client 106) and server-side program 102 (occasionally referred to as server 102) may work together to provide a user of computing device 107 with an online gaming experience. In such a circumstance, server-side program 102 may actually include one or more game-related programs. In operation, client-side program 106 may receive content from server-side program 102 and may occasionally send requests to server-side program 102 in an effort to affect the content being provided. As shown, FIG. 1 includes only one device executing a client program. In practice, however, server-side program 102 and computing device 103 may be providing content to many clients at or near the same time.

For example, in some embodiments, server-side program 102 may be hosting and serving a massively multiplayer online game (MMOG) environment to hundreds or thousands of users. The content that makes up the environment may include, for example, game objects, game players, images, sounds, text, etc. This content may eventually be received by client-side program 106 and presented to the user of computing device 107 via a computer screen, audio speakers, or other appropriate device.

In the gaming example, client-side program 106 may be a local game program or client application that performs several tasks including the receipt of content provided by the server-side program 102. The client-side program 106 may process certain content and facilitate a user's interaction with the server program. For example, a user may input a game interaction request via some user input device associated with device 107. The input may "tell" the game client to select game objects, move game objects, interact with other game players, and the like. The client game program may receive the game input request, process it, and send a request to implement the input to the server side game program executing at computing device 103.

In some situations, the request may travel to the server program 102. In response, the server program 102 executing at computing device 103 may "allow" the request and provide new or altered content based on the allowance. For example, if the game interaction request is to move a game object, the game program executing at computing device 103 can provide new image information to client-side program 106 that shows that an object has been moved. In a MMOG environment, the game program executing at computing device 103 may also be tasked with providing the new or altered content to multiple users at multiple locations via network 104.

As the number of communicative interactions between a server and its clients increase, the potential for a distracting event at one or more client-side computing devices may also increase. In the online gaming sphere, distracting events (sometimes called lag) can take several forms and may have several identifiable sources. Common forms of lag include game freezes, stuttering, warping, and rubber banding. These forms of lag are typically associated with movement or action. Other forms of lag include ghosting, vanishing, "slash-slash-pause," and low frames-per-second (FPS) artifacts. Identifiable sources of lag include latency spikes over 150 ms, router congestion, broadband overloading, server crowding, and client slowness.

In practice, client slowness is often attributable to the computing device executing the client-side program. For example, in FIG. 1, computing device 107 may have some computing bottleneck. Device 107 may be Central Processing Unit (CPU) limited, bus limited, hard drive limited, etc. In other words, a user participating in a MMOG hosted and served by computing device 103 may experience distracting events while playing the MMOG as a result of some deficiency in computing device 107. Furthermore, the network between device 107 and device 103 may be slow or incapable of providing data at a rate or speed fast enough to prevent all forms of lag. In the depicted embodiment of FIG. 1, processor module 108 may be added to computing device 107 to help reduce the impact of such a computing bottlenecks.

As indicated above, there are many applications and platforms that rely on maintaining a coherent data state between two or more devices or nodes. In the gaming context, a server may be maintaining the game state for most of the game, and one or more clients may need to be kept coherent with the server's game state. The practice of maintaining coherency may involve the periodic and the ad hoc communication of state data updates. While these update communications may typically pass between client program 106 and server program 102, processor module 108 may be added to computing device 107 and may act as a middle node that "sees" and caches all or part of these communications. If processor module 108 keeps a copy of some or all of the state data, acceleration of communications between client 106 and server 102 may be possible.

In practice, processor module 108 may require certain authoritative responsibilities to help reduce the amount of authoritative work that needs to be done by server 102 or by client 106. Offloading some decision making from server 102 or client 106 may effectively accelerate the communications between the client and the server. It should be noted that processing module 108 could be implemented in several ways and/or locations. For example, processor module 108 may be a software module, a hardware device, a card, a network card, an inline Ethernet-connected dongle, a chip, ASIC, FPGA, or any other appropriate device or software. Similarly, client 106 and server 102 may be implemented in any of several ways such as those listed above.

The process of maintaining a separate cache (or copy) of a game state in processor module 108 could be enabled in several different ways. For example, client 106 and server 102 may be either actively or passively exchanging state information, such as game state. Processing module 108 may be intercepting or "watching" these game state communications as they are sent between client 106 and server 102. Processor module 108 may be capable of watching by virtue of being either literally or virtually in the communication path. To be literally in between client 106 and server 102, processing module 108 may need to have two or more interfaces, one facing towards client 106, and the other facing towards server 102. In practice, there may be any number of additional "hops" between each of these nodes as is consistent with Internet and networking devices. To be virtually placed between client 106 and server 102, both client 106 and server 102 may be programmed to speak to one another through intermediate processing module 108 for at least game state updates and creations. This may be accomplished, for example, by assigning a Network Address or IP Address to the processing module 108, and directing client 106 and server 102 to communicate with one another through that processing module address.

If processing module 108 is capable of keeping a copy of some or all of the applicable state data, acceleration of communications between client 106 and server 102 may be possible. As indicated above, accomplishing acceleration of communications between client 106 and server 102 may be facilitated by empowering processing module 108 to be authoritative when using the cached copy of some or all of a game's state.

For example, if client 106 requests a character movement and initiates a sending of the request to server 102, client 106 may be able to get "approval" for the move more quickly if processor module 108 can approve the move as opposed to burdening server 102 with the approval process. In effect, the move request is authenticated authoritatively by processor module 108. This may be doable because an accurate accounting of the necessary persistent data and coherent cached state data exists at processor module 108. With this information, processing module 108 can intercept the move request, perform the calculations previously computed by server 102 or client 106, and authenticate the request. In some embodiments, processing module 108 may also let server 102 know that a move request has been granted so that server 102 can update its own state information, or alternatively module 108 may proactively inform other clients who need to know without impacting the server at all, or minimally. In addition, processing module 108 can intercept communications from the server 102, such as game status update inquiries, and respond to those communications, thereby reducing the load on the client 106. Whichever direction a module 108 communication goes, in some embodiments the module communication will be identified as a module communication and will be trusted by the recipient as a result.

In practice, if processing module 108 is placed very close, physically or virtually to client 106, the communications between processing module 108 and client 106 may be much faster, and the amount of communication between client 106 and server 102 may be reduced. Similarly, if processing module 108 is placed very close, physically or virtually, to server 102, the communications between processing module 108 and server 102 may be faster as well.

Referring back to FIG. 1, in an example MMOG implementation, client 106 may believe it is relying on server 102 to authorize requested movements about a terrain or game map. The perceived process may involve client 106 sending a "movement request" to server 102, which replies with a "movement response." With processor module 108 in place, the process may be altered. For example, when client 106 is started, processor module 108 may be loaded with the "terrain map." In practice, objects that were not included in the terrain map but may nonetheless affect user movement may be sent from server 102 to client 106 through processor module 108. Processor module 108 may "see" these communications and passively keep track of the relevant terrain, a client 106 user position, and any objects that may impede movement of the client 106 user through the terrain.

By storing accurate information at processor module 108, the movement requests from client 106 may be actively intercepted by processor module 108 and may be authoritatively allowed or disallowed by processor module 108 rather than by server 102 directly. As indicated above, it is sometimes desirable that server 102 be kept aware of a client character position on the terrain map. As such, processor module 108 may be implemented to send a special message to server 102 describing the new location of a client character. In some embodiments, processor module 108 may simply forward the original request to server 102, and ignore the response from the server, since processor module 108 already gave a response to client 106.

In implementations where a special message is sent to server 102, server 102 may be relieved of obligations like checking that processor module 108 behaved correctly. The implementation may, however, require server 102 to understand or be programmed to recognize that when a processing module like processor module 108 is in the flow, server 102 will get 'special messages' rather than normal requests and that these special messages should be trusted.

In implementations where processor module 108 simply forwards the original movement request to server 102 and then ignores the reply from server 102, server 102 may not need to be modified for any "special messages." In either implementation, client 106 perceives that the network responsiveness is much faster than before because the processing module 108 is performing calculations faster and sooner than server 102 could.

Depending upon implementation detail, the types of requests processing module 108 is equipped to handle may be preprogrammed, may be fixed, may be updateable, etc. Moreover, the method or manner by which processing module 108 reacts to various communicative interactions between network elements may be preprogrammed, fixed, updateable, etc. In some situations, processing module 108 may passively or actively maintain enough information to service certain client or server requests as the requests are made.

In some situations, processing module 108 may be configured to anticipate a client request and to pre-fetch an answer from server 102. For example, processing module 108 may "see" a certain type of client request pass from client 106 to server 102. Processing module 108 may "know" that client 106 will send a related request as soon as server 102 responds to the original request. As such, processing module 108 may make the related request while client 106 is waiting for a response to the original request. In this manner, processing module 108 may have an answer to the related request before client 106 even knows that it needs to make the related request.

Whatever tasks processing module 108 is designed to implement, the act of allowing processing module 108 to perform those tasks potentially removes some burden from server 102 and/or reduces client 106's reliance on server 102. The amount of burden and reliance removal may depend on the number and type of tasks "assigned" to processing module 108. For example, if a game character wishes to begin an attack with a sword, processing module 108 could be implemented such that processing module 108 determines if the character is allowed to attack, what sword the character is using, and how much statistical damage was caused. In this example, processing module 108 was not tasked with determining if an attack was successful. The task of determining the success or failure of an attack may be too sensitive to leave to processing module 108.

The tasking of processing module 108 may be implemented in hardware, firmware, software, etc., and the determination of which tasks to assign may be made based on one or more design criteria. For example, some sensitive tasks may be reserved to server 102 such as those tasks that require extreme protection or the interaction of additional users or network elements.

In the gaming context, certain sensitive tasks—even if they are assigned to processing module 108—may need to be protected from the user of computing device 107. If the sensitive tasks are left unsecured, a game user might attempt to exploit the fact that something other than server 102 is performing computations. For example, if left unsecured, processing module 108 might be hacked (or modified maliciously) to apply double damage from the above described sword attack. Such a hack could give the hacker an unfair advantage and reduce the overall experience for gamer players who are not cheating.

To help reduce the likelihood of successful hacking, processing module 108 could be implemented in a relatively secure manner. As described above, processing module 108 could be implemented with a general purpose processing device or computer, a piece of hardware plugged into a computer such as a card, an ASIC, and/or some other piece of silicon. Moreover, each of these implementations may make use of hardware, software, firmware, and/or combinations thereof, to enable a secure distributed processing.

In one implementation, a 'hacker-safe' processing module 108 may include a memory and program located on a card that embodies processing module 108. In practice, the memory and program would not be readily accessible to a personal computer (PC) user. This may be accomplished, for example, by hiding or not exposing the card memory as addressable by the machine (PC) in which the card is plugged. For example, processing module 108 may be configured such that on-card memory is not mapped to the PCI or PCI-Express memory map.

Additionally, in some embodiments a "Digital Signature" may be utilized to help protect processing module 108. In practice, unhacked firmware or software performing all or part of processing module 108's tasks may be 'signed' or contain a trailer or header of data that shows that the firmware and/or software was written by a trusted entity. This 'Digital Signature' approach could utilize protocols such as SSL and IPSEC. Moreover, similar concepts may be implemented using a Public Key encryption algorithm (such as RSA), and running the cipher over firmware using a Private Key to create a 'signature'. In practice, the signature may then be verified by a public key when software is about to be loaded into the device.

As an additional security measure, the contents of the 'Digitally Signed' firmware/software could be hidden. This may be implemented, for example, by using Symmetric Key encryption in certain circumstances. For example, a card, chip, etc. may be preloaded with a very secret Symmetric Key, such as an AES Key or 3-des Key, and when firmware updates are downloaded or executed, the update may be decrypted using the Symmetric Key. Similarly, a randomly generated Symmetric Key may be used for each download requiring a fresh download every time the application is run 'online'. This technique could be implemented, for example, with the SSL, ISAKMP or IKE methodologies of key exchange in order to help guarantee randomness and safety.

In practice, after an encryption key is loaded in a device, that key may be used for an entire session to encrypt all or some of the data leaving a central processing core and decrypt all or some of the data that enters the central processing core. This level of protection may help stop hackers from viewing or modifying contents of the executable code as well as temporary data that may need to be stored. It should also be noted that hardware protection such as potting, hidden vias, no vias, ball grid array (BGA) packages, and many other hardware level security techniques may be used to protect the board from physical probing. Potting would be used, for example, as a special coating or substrate applied to some portion of processing module 108 so as to protect it from tampering.

Moreover, various levels of authentication may also be employed to help ensure that a specific task is being performed by processing module 108 as opposed, for example, to some piece of malicious code pretending to be processing module 108. Authentication may be performed in several ways. For example, SSL or IPSEC client authentication may be used or RSA and similar public key encryption algorithms could be used to create new non-standard authentication methods, and/or various combinations thereof may be used. With these techniques, authentication may be accomplished as part of the protocol, or during key exchange, or as a special authentication process. These methods usually require registering some portion of processing module 108 with a trusted central authority who digitally signs a certificate indicating that a Device ID and public key pair being claimed is in fact valid. Thus, if the Device in question can sign a piece of randomly supplied data with a 'private key' associated with the well known public key, such that the public key can be used to check the digitally signed random number, then said device can be said to be authenticated because only a device with the super-secret private key in it could sign a random piece of data such that the public key could unlock it.

Once a client has been authenticated, messages going to and from Server and Distributed Processing Module may then need to be periodically or continually digitally signed with a private key or some other key. Alternatively a key exchange could take place using public/private key exchange algorithms mentioned above, and then all or part of data could be encrypted or signed with the exchanged symmetric key, which might periodically be changed as is done in SSL protocols. The latter method is usually superior as public/private key encryption is usually more computationally intense and no more secure than encryption done with exchanged symmetric keys.

Depending upon implementation detail and in order to help protect against the possibility of losing a 'private key' or having it stolen or exposed, there could exist multiple private keys inside the same device, and a hardware or software toggle could be utilized to 'switch' to a new private key in the device. Storing and protecting keys for processing module 108 could be accomplished in several ways. The keys could be fixed into a CHIP or ASIC, built into an FPGA or programmable device, stored in Flash or ROM, 'potted' with a special substrate, etc. As further protection, each device (Device ID) would be assigned it's own unique Device ID and private key/public key pair, such that in the even that a cheater/hacker did get access to a private key used for authentication, that key would only unlock 1 board, and not all boards. Further, if discovered, the central authority could invalidate or expire that certificate and it would no longer be trusted.

Figure 2:
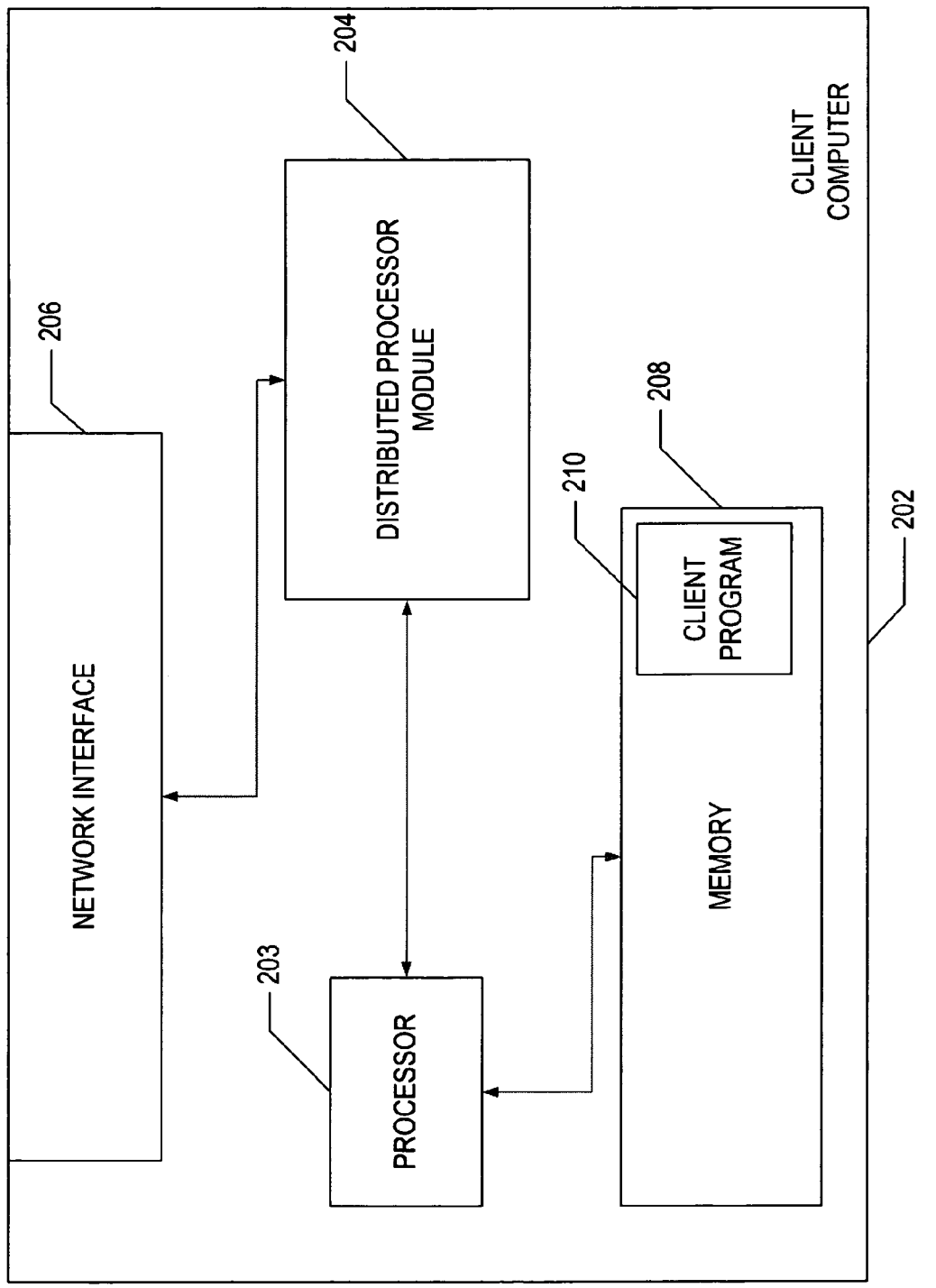
FIG. 2 is a block diagram of a particular embodiment of a computing device that incorporates teachings of the present disclosure.

Reference is made now to FIG. 2 to further describe one embodiment of a processing module like processing module 108. As mentioned above, FIG. 2 depicts a block diagram of a particular embodiment of a computer device 200. The computer device 200 includes a housing 202 that defines a physical enclosure. Disposed within the housing 202 are a processor 203, a distributed processor module 204, a network interface 206, and a memory 208. The memory stores a client program 210. The memory 208 is accessible to the processor 203. The distributed processor module 204 is connected to the processor 203 and to the network interface 206. In some embodiments, the network interface 206 might be built into the distributed processor module 204, and distributed processor module 204 may look as though it is a Network Card to the Processor and run via a PCI Bus.

The processor 203 can be a microprocessor, a microcomputer, a central processing unit (CPU) or other processing device. The network interface 206 can be an Ethernet card or chip or other network interface device. The memory 208 can be a random access memory (RAM), a hard drive, or other appropriate memory device.

During operation, the processor 203 runs the client program 210. The client program can be a game program, a multimedia player such as a video or audio player, or other program. The client program 210 interacts with a server program over a wide area network, as explained with respect to FIG. 1.

For example, the client program 210 can be a game program. During execution of the client program 210, the processor 203 can send game interaction requests targeted to a game program resident on a remote server. The distributed processor module 204 can monitor the requests and determine which requests can be serviced locally at the distributed processor module 204. If a request can be serviced locally, the distributed processor module 204 can intercept the request, process the request, and provide the appropriate response to the processor 203. In some embodiments, the distributed processor module 204 may then provide update information to the server game program to help ensure coherency.

If the game interaction request cannot or should not be serviced locally by the distributed processor module 204, the module can provide the request to the server game program via the network interface 206. In some cases, the distributed processor module 204 may communicate a request to the server game program for additional information that might allow the distributed processor module 204 to service the request. The distributed processor module 204 can receive the requested portions via the network interface 206, and can store the portions of the server game program to service subsequent game interaction requests.

As discussed above, module 204 may have its own processor 212 and memory 214. In practice, memory 214 may be kept secret and may not be included in any system wide memory map of device 200.

Figure 3:
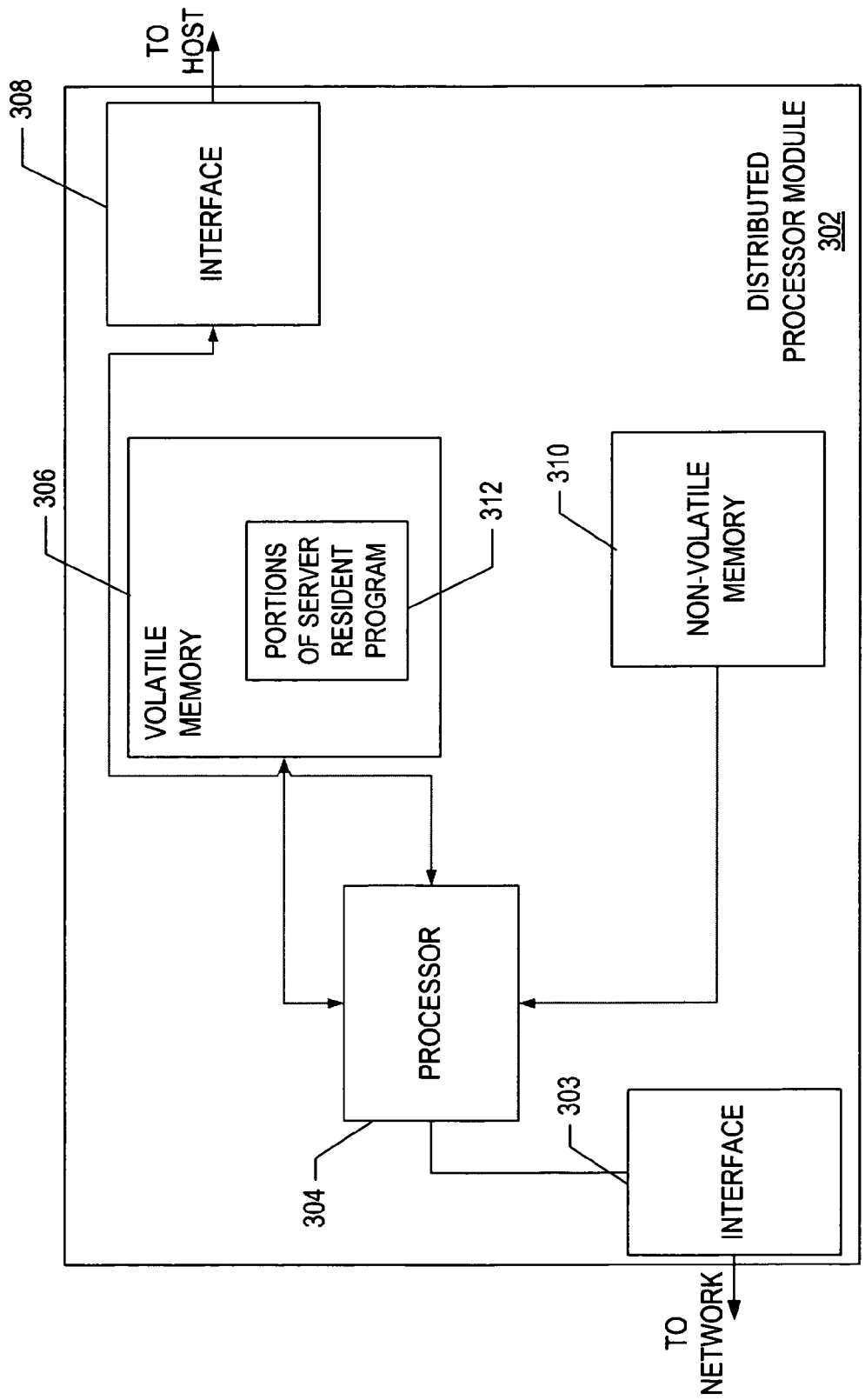
FIG. 3 is a block diagram of a particular embodiment of a processor module.

Referring to FIG. 3, a block diagram of a particular embodiment of a distributed processor module 302 is illustrated. As shown, module 302 includes two interfaces 303 and 308. In practice, interface 303 may go to the 'network', and interface 308 may go to the 'host' processor. Depending upon implementation detail, either or both interfaces may include a BUS, an Ethernet compliant interface, a USB interface, a SCSI interface, a wireless interface, some other appropriate interface, and/or a combination thereof. The distributed processor module 302 may also includes a processor 304, a volatile memory 306, and a non-volatile memory 310. As depicted, processor 304 can access the non-volatile memory 310 and the volatile memory 306. In addition, the processor 304 may be "connected" to both the host and the network via interfaces 308 and 303 respectively.

The processor 304 may be a microprocessor, a microcomputer, a central processing unit (CPU), an FPGA or some other processing device. The interface 308 may be a bus interface such as PCI, PCI-E, or USB, a backplane bus, an Ethernet interface, or other communications interface. The volatile memory 306 may be a random access memory (RAM), or other volatile memory device. The non-volatile memory 310 may be a read only memory (ROM), flash memory, or other non-volatile memory. In practice, the volatile memory 306 stores information 312, which may also be stored at a server-resident program.

During operation, distributed processor module 302 monitors communications between a program resident on a client computer (not shown) and a program resident on a server computer (not shown), intercepts some or all of these communications, and executes some portion of the server resident program on behalf of the server in response to the intercepted communications. By intercepting and locally processing the communications between the client-resident program and the server-resident program, the distributed processor module 302 can reduce the amount of lag, latency and/or other communication problems between the server-resident and client-resident programs.

In practice, communications between the programs are monitored by processor 304 via the interface 308, which receives communications from the client-resident program. When the processor 304 detects an appropriate communication between the client resident program and the server resident program, the processor 304 intercepts the communication, and accesses the portions of the server-resident information 312 stored in the volatile memory 306. The processor 304 responds to the intercepted communication via the interface 308. In this way, the distributed processor module 302 emulates the server-resident program for the client-resident program. After responding to the communication, the processor 304 can also send update information to the server-resident program so that the state of the server-resident program and the client resident program are synchronized.

In a particular embodiment, the server resident program is an online game server program and the client-resident program is an online game client program. The distributed processor module 302 monitors game interaction requests from the online game client program to the online game server program, intercepts certain of the game interaction requests, processes those requests, and provides appropriate information to both the client and server programs.

For example, the client program may initiate a game interaction request that indicates a game character wants to cast a spell. The distributed processor module 302 receives the spell request and determines that the request can be processed locally. Accordingly, the processor 304 accesses the portions of the server resident information 312 to process the spell request. This processing can include checking game rules to determine whether the request is valid and other procedures. After the spell request has been processed, the distributed processor module 302 sends game update information to both the client and server-resident programs. For example, the distributed processor module 302 can indicate to both programs that the spell cast request was valid, so that the programs can update the state of the game appropriately.

Further, the distributed processor module 302 can include several security features to ensure that its operation and portions of the server-resident information 312 are protected from hacking or other unauthorized access. As a first level of security, addressability of the volatile memory 306 can be restricted to the processor 304, so that the volatile memory 306 is not addressable by the processor of the client machine. This makes it more difficult for the client machine to access the portions of the server-resident information 312.

A second level of security can be implemented by instituting a firmware authorization procedure with the distributed processor module 302. In particular, the non-volatile memory 310 can store firmware for the processor 304. The processor 304 can access the firmware to perform system functions, such as boot functions, debug functions, and the like. In the absence of security measures, a hacker could replace the normal firmware for the distributed processor module 302 with special firmware that allows the hacker to access the portions of the server-resident information 312. Accordingly, the firmware of the distributed processor module may be further protected by inserting a digital signature, such a signature that complies with SSL and IPSEC protocols, in the firmware. The module 302 would check this digital signature against an authentication key, and only operate firmware that includes the authentication key.

In addition, the firmware can be encrypted to make the firmware itself more difficult to hack. For example, the distributed processor module 302 can be loaded with a symmetric key, such an AES key, a 3-des key, and the like, and the processor 304 can decrypt the firmware using the symmetric key. This symmetric key could be further protected by a Public-Private Key pair. Accordingly, only firmware that has been encrypted with the appropriate symmetric key can be used by the processor 304. Other firmware encryption methods can also be used. For example, a randomly generated symmetric key could be used, where a new key is downloaded each time the distributed processor module 302 is used.

In addition, these encryption methods can also be used for other data besides the firmware. For example, the data stored in the volatile memory 306, such as the portions of the server-resident information 312, can be encrypted using these methods to provide additional security. The stored data would be decrypted by the processor 304 each time the data is accessed, so that unencrypted data is not stored outside the processor 304. The encrypted data can be encrypted using a symmetric key that can be downloaded via either interface 304 each time the distributed processor module 302 is used.

Further, the hardware of the distributed processor module 302 can be protected by security measures. For example, the distributed processor module 302 can be potted or protected with a special coating or substrate to protect the module from tampering. These measures would make it more difficult for the module hardware, such as the processor 304 and the volatile memory 306, to be accessed by a hacker using a hardware hacking device, such as an external probe.

Moreover, the distributed processor module 302 can use authentication techniques for security purposes. For example, the distributed processor module can send a password, symmetric key, or other authentication information to the server via the interface 308 prior to downloading the portions of the server-resident information 312. If the server receives improper authentication information, the server can refuse to send the portions of the server-resident information 312 or alternatively, refuse to allow the Module to perform any trusted calculations. For added security, authentication can be required for all communications between the distributed processor module 302 and the server. Other security schemes can also be employed. For example, the server can request authentication of the distributed processor module 302 randomly or periodically.

Figure 4:
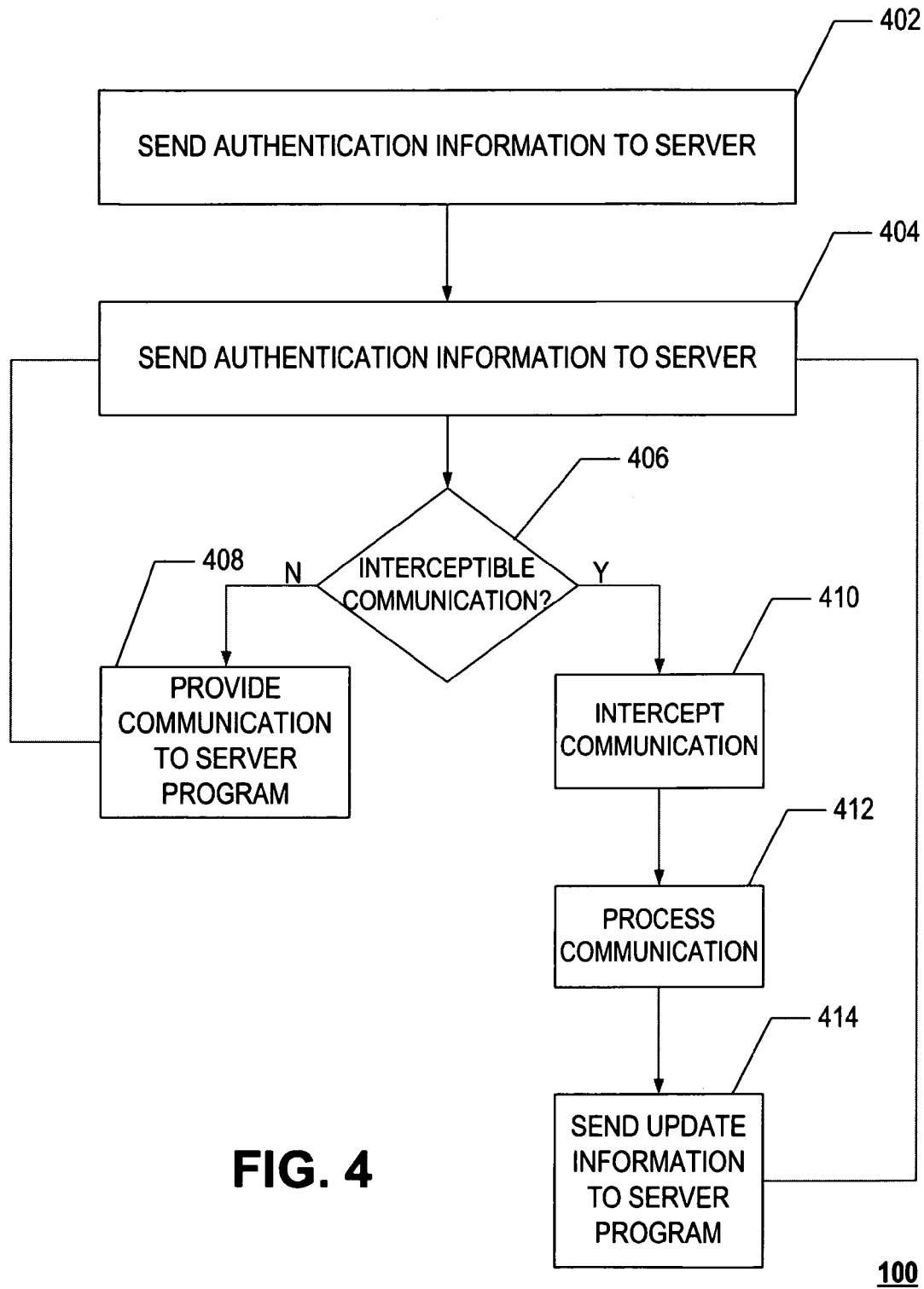
FIG. 4 is a flow diagram of a particular embodiment of a technique for monitoring and managing communications intended to travel between a client program and a server program.

Referring to FIG. 4, a flow diagram of a particular embodiment of a method of monitoring communications between a client program and a server program is illustrated. At block 402, a distributed processor module sends authentication information to a server. The server may be the same server executing the server program, a separate security server, or other server. This authentication information can be used to ensure that the distributed processor module is authorized to monitor communications between the client program and the server program.

Moving to block 404, the distributed processor module actively or passively monitors communications between the client program and the server program. At decision block 406, the distributed processor module determines whether a monitored communication is capable of interception. In a particular embodiment, interceptible communications include communications that the distributed processor module is able and permitted to process locally at the module.

If, at block 406, it is determined that the communication is not an interceptible communication, the method moves to block 408 and the communication is provided to the server program, so that the server program can process the communication. The method returns to block 404 and the distributed processor module continues to monitor communications.

Returning to block 406, if it is determined that the communication is interceptible, the method proceeds to block 410 and the communication is intercepted. The method moves to block 412 and the communication is processed. For example, if the communication is a game interaction request, the distributed processor module can check game rules to determine if the interaction request is allowed, and respond to the request appropriately, or may simply perform basic pre-computations to assist the server which will ultimately validate the interaction request. The method moves to block 414 and update information is optionally sent to the server program based on the processed communication. For example, if the communication is a game interaction request, the distributed processor module can send information to the server program indicating that the request was made and how the request was processed, or alternatively that the request was made, and the results of some pre-computations done on behalf of the server. The method returns to block 404 and the distributed processor module continues to monitor communications.

Accordingly, the distributed processor module is able to monitor communications between a server program and a client program, and process some of those communications locally. This allows the distributed processor module to respond more rapidly to the communications than the server program, thereby reducing lag, latency, and other communication problems.

The above disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system, comprising:
 a housing component at least partially defining an enclosure;
 a first processor located within the enclosure, the first processor operable to execute at least a portion of a locally stored game client and to communicate with a remote game server to execute an online game; and
 a gaming processor module, the gaming processor module responsive to the first processor and operable to:
  monitor a first communication between the game client and the remote game server;
  determine if the first communication can be processed by the gaming processor module;
  in response to determining the gaming processor module can process the first communication, intercept the first communication, process the first communication at the gaming processor module and provide a response to the first communication; and
  in response to determining the gaming processor module cannot process the first communication, provide the first communication to one of the locally stored game client and the remote game server.

2. The system of claim 1, wherein the gaming processor module is located within the enclosure.

3. The system of claim 1, wherein the gaming processor module is further operable to provide a game update message to the remote game server for a processed request.

4. The system of claim 1, wherein the gaming processor module comprises a second processor and a second memory, the second memory accessible to the second processor.

5. The system of claim 4, wherein the second processor comprises a field programmable gate array (FPGA).

6. The system of claim 4, wherein the second processor comprises a microprocessor.

7. The system of claim 4, wherein the second memory is not accessible to the first processor.

8. The system of claim 4, wherein the gaming processor module further comprises firmware.

9. The system of claim 8, wherein the firmware includes a digital signature.

10. The system of claim 8, wherein the firmware is encrypted.

11. The system of claim 1, wherein the first communication comprises a game interaction request from the first processor to the remote game server.

12. The system of claim 1, wherein the first communication comprises a game interaction request from the remote game server to the first processor.

13. The system of claim 1, wherein the gaming processor module emulates one or more functions of the remote game server.

14. The system of claim 1, wherein the gaming processor module emulates one or more functions of the locally stored game client.

15. The system of claim 13, wherein the gaming processor module executes one or more software programs to emulate the one or more functions of the remote game server, and further wherein the one or more software programs are encrypted.

16. The system of claim 13, wherein the gaming processor module executes one or more software programs to emulate the one or more functions of the remote game server, and further wherein the one or more software programs include a digital signature.

17. The system of claim 16, wherein the gaming processor module executes the one or more software programs in response to authentication of the digital signature.

18. The system of claim 1, wherein a network card comprises the gaming processor module.

19. A distributed processor module, comprising:
 a first interface configured to receive a communication from a client;
 a second interface configured to receive a different communication from a server;
 a module processor communicatively coupled to at least one of the first and second interfaces and operable to:
  monitor communications between the client and the server, the communications including a first communication;
  determine if the first communication can be processed by the module processor;
  in response to determining the module processor can process the first communication, intercept the first communication, process the first communication at the module processor and provide a response to the first communication; and
  in response to determining the module processor cannot process the first communication, provide the first communication to one of the client and the server; and
 a first memory to store executable instructions for emulating one or more functions of the server.

20. The distributed processor module of claim 19, wherein a network card comprises the first and second interfaces, the module processor, and the first memory.

21. The distributed processor module of claim 19, wherein the module processor and the first memory are protected from tampering.

22. The distributed processor module of claim 21, wherein the processor is disposed at a ball grid array (BGA) package.

23. The distributed processor module of claim 19, further comprising a second memory to store firmware, the firmware including a digital signature.

24. The distributed processor module of claim 19, further comprising a second memory to store encrypted firmware.

25. The distributed processor module of claim 19, wherein each of the first and the second interfaces comprise an Ethernet-compliant interconnect.

26. The distributed processor module of claim 19, further comprising a cache operable to maintain information received via the second interface.

27. The distributed processor module of claim 19, further comprising a dongle housing component at least partially defining an internal space in which the module processor and the first memory are located.

28. The distributed processor module of claim 19, further comprising an emulator operable to emulate the server or the client, the emulator further operable to initiate a sending of a trusted message to the server, wherein the trusted message is recognizable as coming from the emulator.

29. A method, comprising:
 monitoring at a gaming processor module communications between a client game program and a server game program, the client game program executed at a client computer and the server game program executed at a server computer;
 intercepting a communication between the client game program and the server game program;
 determining if the communication can be processed by the gaming processor module;
 in response to determining the gaming processor module can process the communication, processing the communication at the gaming processor module and providing a response to the communication; and in response to determining the gaming processor module cannot process the communication, providing the communication to one of the client game program and the server game program.

30. The method of claim 29, further comprising:
providing game update information based on a game event request to the server game program.

31. The method of claim 29, further comprising:
providing a response to the client game program, wherein the response emulates an expected response from the server game program.

32. The method of claim 29, further comprising:

anticipating a related game event request;

requesting from the server computer a response to the related game request; and providing the response to the client game program.

33. The method of claim 32, wherein each of the steps is performed by a distributed processing dongle connected to the client computer.

* * * * *